United States Patent
Walander

[11] 3,712,565
[45] Jan. 23, 1973

[54] BARRIER SYSTEM FOR AIRCRAFT OF DIFFERENT SIZES

[76] Inventor: Karl Ove Torgny Walander, Elsa Brandstrom gata 5, Linkoping, Sweden

[22] Filed: Jan. 18, 1971

[21] Appl. No.: 107,345

[30] Foreign Application Priority Data

Jan. 23, 1970 Sweden ..........................80870/1970

[52] U.S. Cl. ............................................244/110 G
[51] Int. Cl. ..............................................B64c 25/68
[58] Field of Search...................................244/110 R, 244/110A, 110E, 110G

[56] References Cited

UNITED STATES PATENTS

| 3,502,289 | 3/1970 | Kelly et al............................ 244/110 A |
| 1,306,860 | 6/1919 | Smith................................244/110 E |
| 1,627,614 | 5/1927 | McNully...........................244/110 E |

*Primary Examiner*—Trygve M. Blix
*Assistant Examiner*—Paul E. Sauberer
*Attorney*—Munson & Fiddler

[57] ABSTRACT

An aircraft arrester system of the type in which a hook mounted on an aircraft engages with a wire connected to braking means, said wire being complemented by additional wires, each of the latter wires having a brake or brakes and each of said wires being arranged parallel and sequentially in the direction of aircraft movement to arrest the movement of aircraft of different weights, such aircraft being provided with additional arrester hooks each of which is intended to engage its respective wire to a number dependent upon the weight of an aircraft.

3 Claims, 6 Drawing Figures

3,712,565

INVENTOR.
KARL OVE TORGNY WALANDER
BY MUNSON & FIDDLER
ATTORNEYS

KARL OVE TORGNY WALANDER
INVENTOR.

BY
MUNSON & FIDDLER
ATTORNEYS

BARRIER SYSTEM FOR AIRCRAFT OF DIFFERENT SIZES

BACKGROUND OF THE INVENTION

A large number of aircraft barrier and arresting systems are known to this art. One of the most popular aircraft arresting systems hitherto used employs a collapsible arrester hook that is mounted in the tail portion of the aircraft and is arranged to co-act with a stationarily-arranged aircraft arresting apparatus, the main component of which consists of an arrester wire extending across the landing path of the aircraft and connected at either end to one or more brake mechanisms.

Such systems have shown some efficiency up to arresting speeds of 70–100 meters per second, depending on the particular construction of the system. A problem in this connection is one of providing systems for arresting the movement of different aircraft having widely differing total weights. One of the reasons why the provision of such a system is problematical is because systems which are designed to produce braking forces sufficient to stop the largest aircraft at high speeds produce loads which are too high for small aircraft. The problem most difficult to solve, together with other problems, are those connected with the loads represented by the arrester wire and the brakes, since these loads at the initial period of the arresting operation must be accelerated to speeds approximately equal to the speed of the aircraft being arrested.

These problems are solved by means of the present invention and in a manner which can be readily performed in practice. There is provided in accordance with the invention, a system by which aircraft, which vary widely in total weight, can be arrested safely. Thus, the system of the present invention will fulfill the requirements of civilian airports, where aircraft varying between 50 to 300 tons total weight are accommodated each day.

DESCRIPTION OF THE INVENTION

The invention is illustrated in the accompanying drawings in which.

In accordance with the invention, the aircraft are divided into a manner of different classes, for example three, depending upon the maximum braking force desired, this force substantially being co-related with the maximum weight of the aircraft. Aircraft belonging in the lightest class may be provided in a known manner with one arrester hook; aircraft in the next weight class with two arrester hooks etc.

Figure 1:
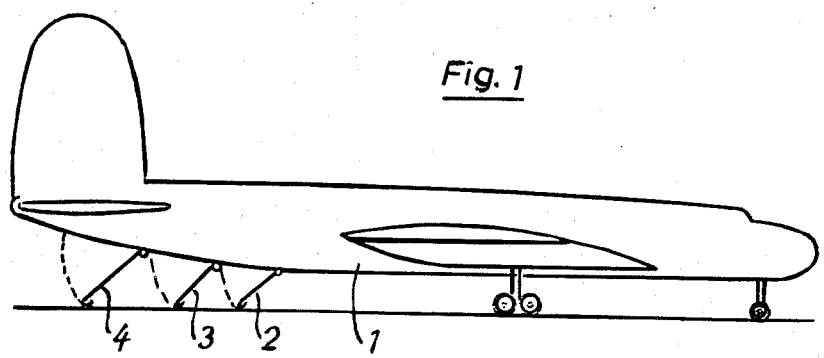
FIG. 1 shows in side view an aircraft provided with three arresting hooks.
Figure 2:
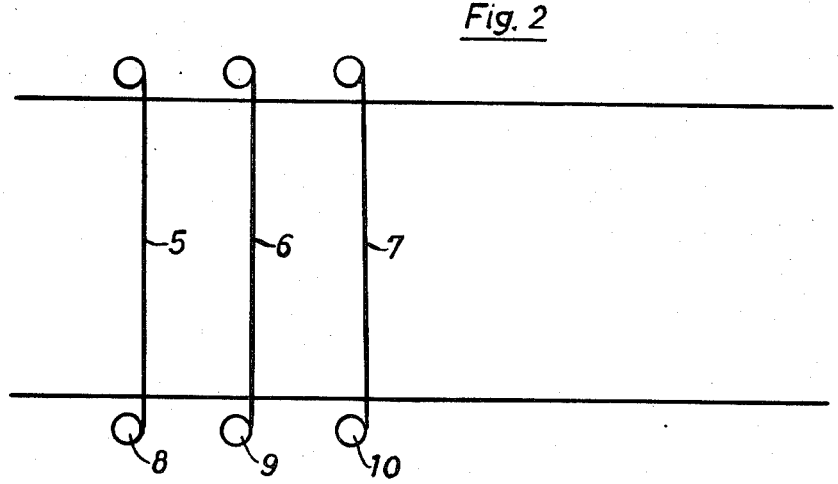
FIG. 2 illustrates in top plan view a landing path with three arresting wires extending transversely across its longitudinal extension.

FIG. 1 illustrates an aircraft provided with three arrester hooks indicated at 2, 3 and 4 and arranged in a line, one behind the other at the tail portion of the aircraft. The stationary ground system installed on the aircraft runway is illustrated in FIG. 2 and is provided with three transversely extending wires 5, 6 and 7 which are arranged parallel to each other and each of which is connected to its respective brake mechanism indicated at 8, 9 and 10.

The system operates substantially as follows:

If an aircraft belonging to the lighter class of aircraft and having only one single arrester hook, and this is in the dropped position, passes over the arresting system, the hook will engage with the first wire and extend it, thereby braking the aircraft. If for one reason or another the hook should miss the first wire, because of hook bounce for example, the following wires will act in reserve, as with existing systems, although with the exception that in many cases the different wires are connected to the same brake mechanism (brake pairs) which in this case are intended to operate alternatively against one of several possible arrester wires.

In the case of a heavy aircraft for example, one with three hooks in dropped position, the first hook will engage the first wire. As a result of the mass force created, the hook will immediately swing up to approximately a horizontal position, and consequently it is important to ensure that the arrangement be so constructed that neither the hook nor the first wire be able to actuate the remaining hooks for example, by striking them, so as to cause these hooks to bounce. Under these conditions, the next hook will engage the next wire, and so on, until each hook has engaged its respective wire.

With a maximum number of hooks and corresponding arresting devices on the ground, a braking force is obtained, if one hook misses, which corresponds to an aircraft in the next lowest weight class. Thus, the ground system should include one more wire than the total number of hooks, in order to provide for a reserve wire in the case of a missed wire.

Figure 3:
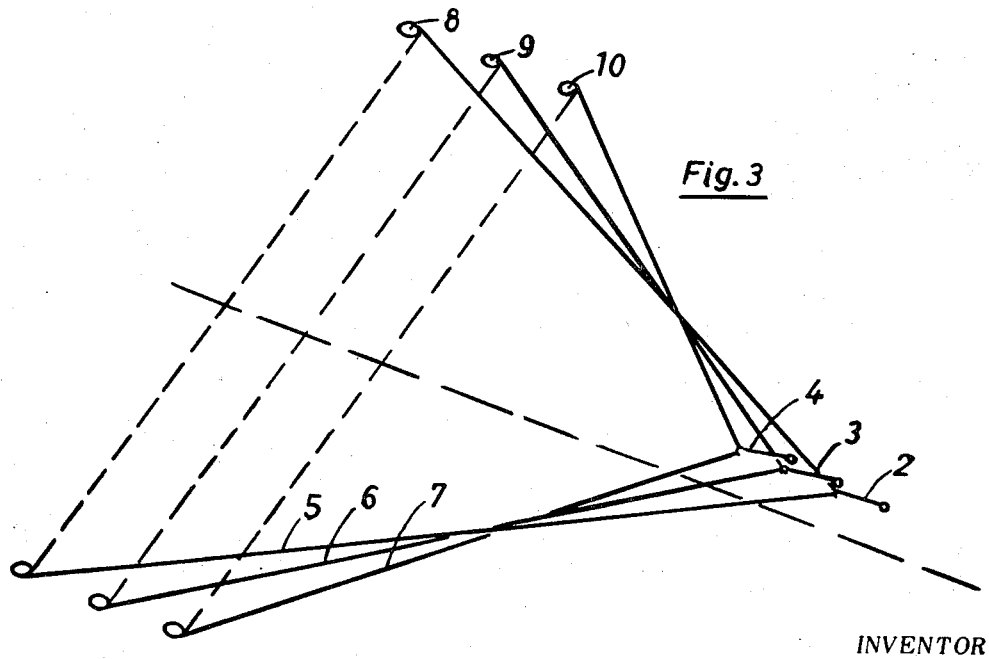
FIG. 3 illustrates in top plan view, the arrester wires in an extended, operative position.

FIG. 3 illustrates an aircraft provided with three hooks being arrested by a ground system which includes three wires. It is of interest to note the pattern of orientation of the wires as they are extended, which places certain requirements on the positioning of the hooks on the aircraft.

Figure 4:
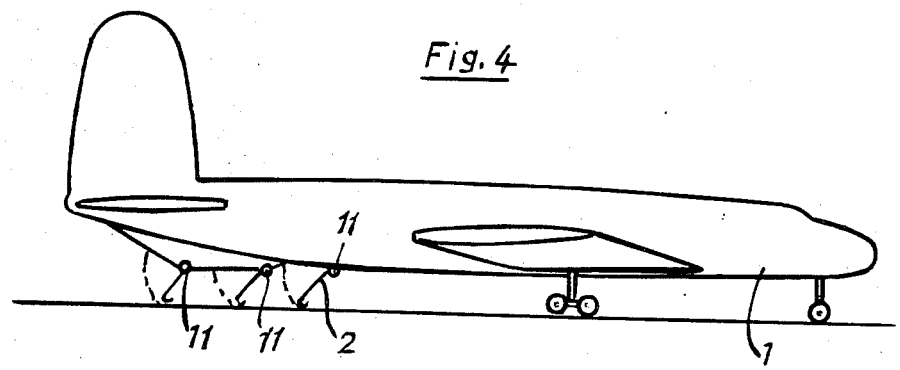
FIGS. 4, 5 and 6 illustrate modified embodiments of the invention.

In the embodiment of FIG. 4 the hooks are mounted so that each subsequent hook has a lower pivot center 11 than the preceding hook. This center need not be fixed, but may be movable relatively to the aircraft and accompany the hook as a part thereof.

Figure 5:
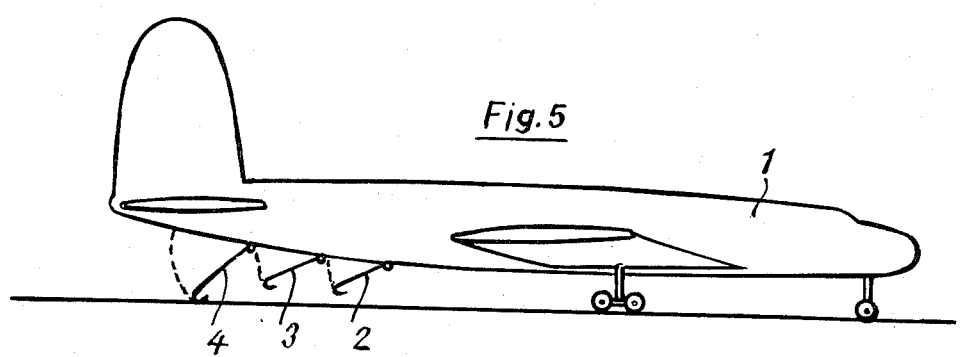

In the embodiment of FIG. 5, the preceding hooks are prevented from reaching the ground until the hook immediately behind has engaged its wire.

Figure 6:
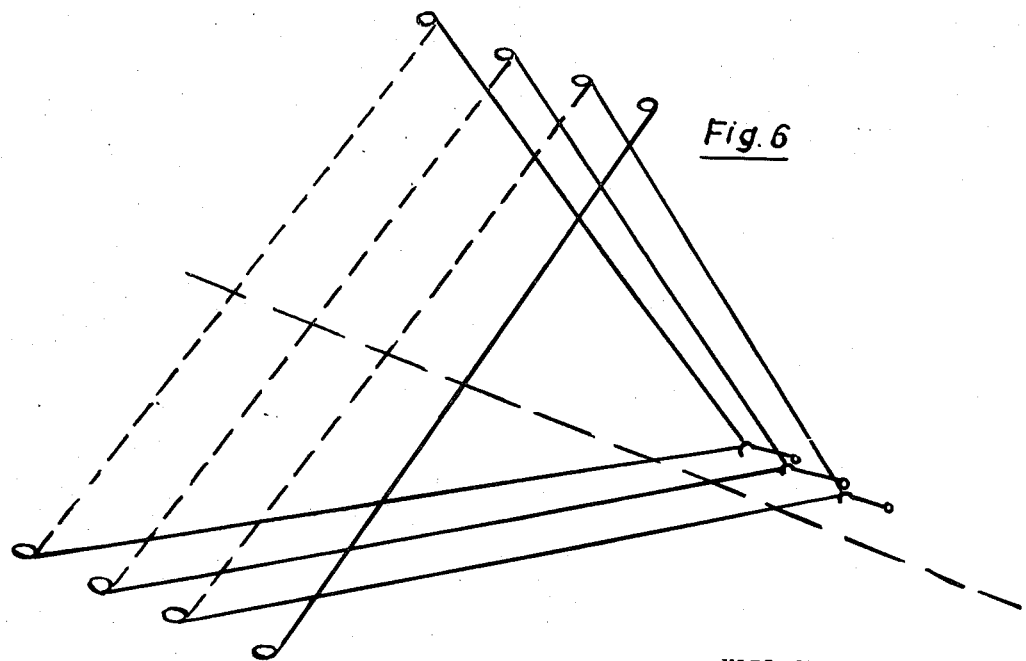

FIG. 6 illustrates the arrest of an aircraft provided with the hooks illustrated in FIG. 5.

In addition to its main function of enabling aircraft which vary greatly in total weight to be arrested effectively, the arrangement of the invention also provides a number of other advantages. For example, the captain of larger aircraft may select the maximum of arresting force in stages, by dropping a reduced number of hooks, that is, if the arresting operation is not carried out at maximum aircraft speed.

Moreover, the ground devices can be so spaced from each other that the load peaks, which occur when wires and brakes are rapidly accelerated to high speeds, do not coincide in time, and thereby relieve the load on the aircraft structure, particularly when only one large system is engaged.

The invention has been described in principle and without describing in detail the particular construction of the different components and the manner in which they are connected together. Such variations, however, are considered to be within the spirit of the invention.

Net structures composed of wire rope, cables, bands, hoses, strings or the like can also be used without departing from the spirit of the invention. Also, any form of brake mechanism can be used. The brakes may be placed in different ways on one or both sides of the runway with the wires on their extensions placed over direction-changing pulleys.

What is claimed is:

1. A system for arresting aircraft upon touchdown on a landing runway comprising:
   a. a plurality of cables suspended in spaced relationship across the runway and each being provided with torque absorption means adapted to be actuated upon engagement with the aircraft;
   b. the combination therewith of an aircraft having a plurality of arrester hooks pivoted to the aircraft tail section and adapted to be selectively lowered into position for engagement with one of said cables;
   c. said cables and said hooks being spaced from one another so as to prevent accidental contact between the hooks and successive cables as the first hook is swung upward by the force of engagement with the first one of the arresting cables, and so as to cause the other hooks to successively engage a single one of the subsequent cables.

2. A system according to claim 1 comprising a greater number of arresting cables than arresting hooks.

3. A system according to claim 1 in which the arresting hooks have successively lower pivot points.

* * * * *